Aug. 29, 1967   Z. S. URBANIAK   3,339,053
APPARATUS FOR CONTINUOUS CAPACITIVE WELDING OF PLASTIC
FOILS BY MEANS OF HIGH-FREQUENCY-CURRENTS
Filed Aug. 12, 1964   4 Sheets-Sheet 1

INVENTOR.
Z. STEFAN URBANIAK
BY
Karl F. Koss
ATTORNEY

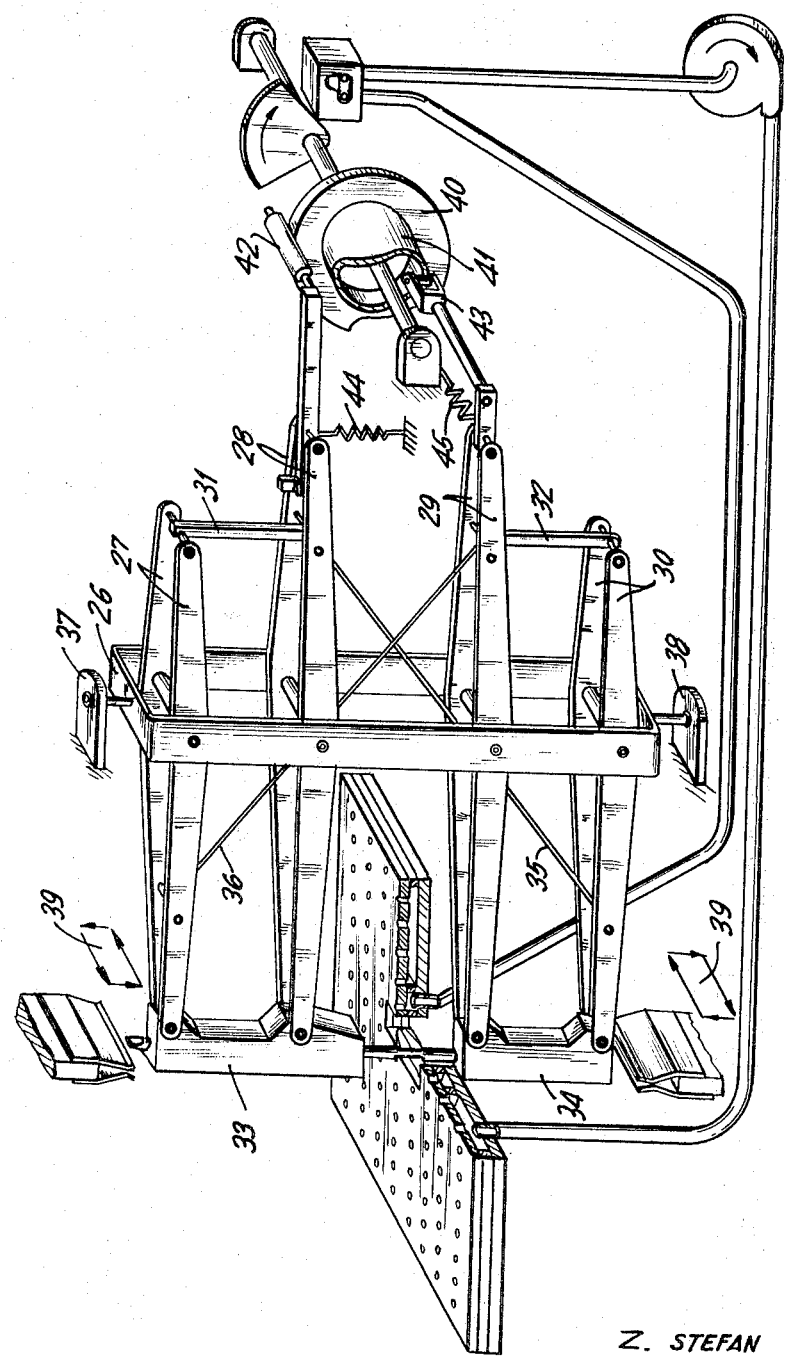

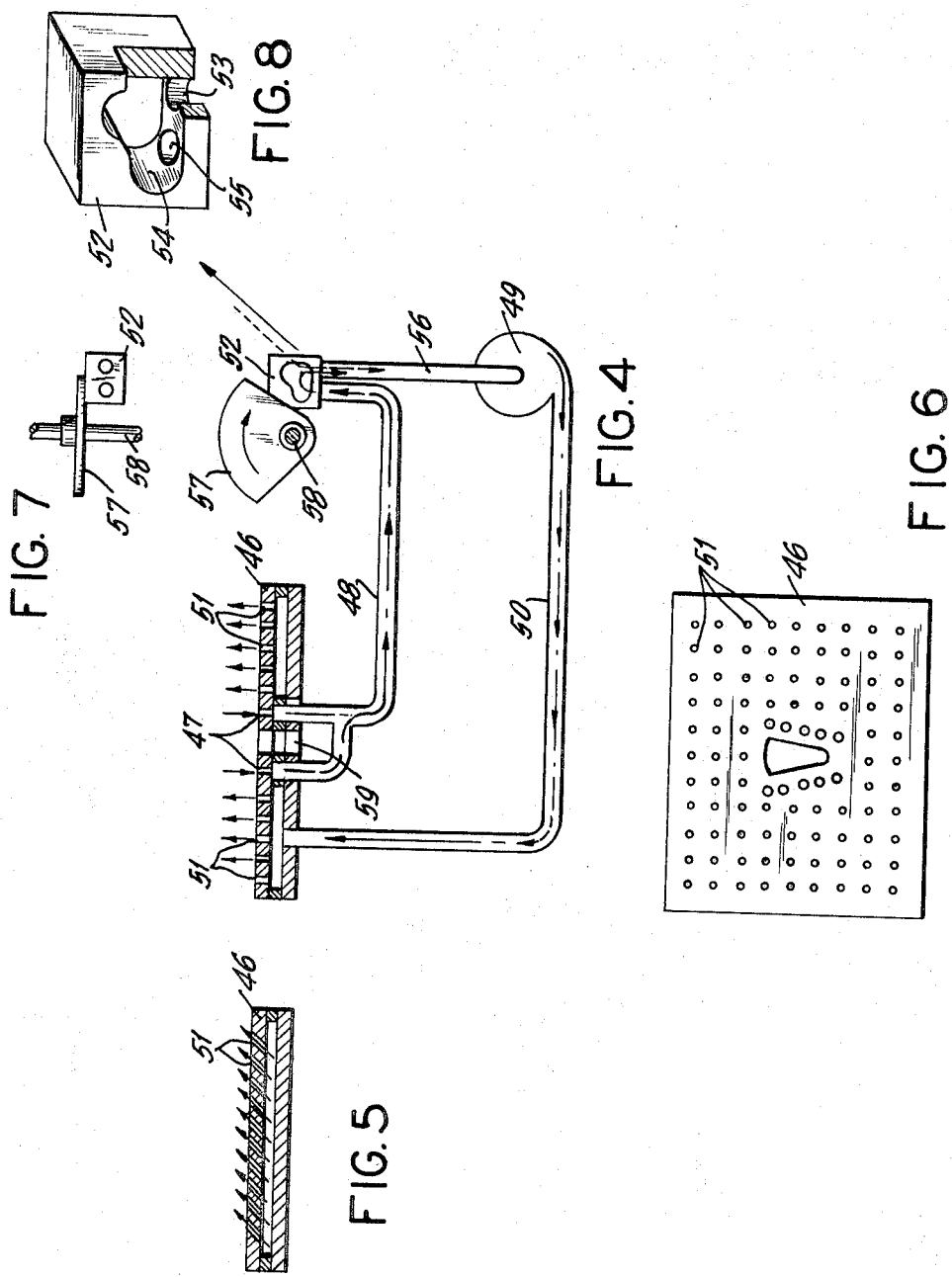

Aug. 29, 1967 Z. S. URBANIAK 3,339,053
APPARATUS FOR CONTINUOUS CAPACITIVE WELDING OF PLASTIC
FOILS BY MEANS OF HIGH-FREQUENCY-CURRENTS
Filed Aug. 12, 1964 4 Sheets-Sheet 4

INVENTOR.
Z. STEFAN URBANIAK
BY
Karl F. Ross
ATTORNEY

# United States Patent Office 3,339,053
Patented Aug. 29, 1967

3,339,053
APPARATUS FOR CONTINUOUS CAPACITIVE WELDING OF PLASTIC FOILS BY MEANS OF HIGH-FREQUENCY-CURRENTS
Zdzislaw Stefan Urbaniak, 36 Zytnia St., Warsaw, Poland
Filed Aug. 12, 1964, Ser. No. 388,996
Claims priority, application Poland, Aug. 14, 1963, 102,377, 102,378; Aug. 21, 1963, 102,414; Aug. 23, 1963, 102,426, 102,427
6 Claims. (Cl. 219—10.53)

The present invention relates to apparatus for the continuous high-frequency welding of plastic foils, as in sections along straight or curved lines.

The process of welding plastic foils by means of high frequency currents on known welding machines, depends on spot or section welding without movement of the electrodes or any change in the direction of welding. The known welding machines are divided into two groups: section-welding machines and spot-welding machines, one modification of which is the roll welding machines.

Section-welding machine electrodes do not change their position with respect to the table of the machine, and the change of the direction of welding is achieved by a corresponding movement of the welded material.

Section-welding machines cannot be satisfactorily used for long-seam welding and especially along curved lines, and cannot ensure an esthetic seam. Moreover, the continuous welding process by means of these machines is uneconomic because of high time consumption factors; it requires the proper placing of the welded material on the table, pressing of the electrode, energization of a high frequency generator for the required period of time, and maintain the pressure of the electrode until the flowing material sets. Then the electrode can be lifted up and the material placed in further position in order to perform a new welding.

In a spot-welding machine the changing of the direction of welding is effected in the same way as in a sewing machine; the process of welding is a similar one and depends on pressing of the electrode, welding and moving the welded material into a new position.

A characteristic defect of all known types of welding machines is the inability to weld thick foils reinforced with textiles.

The above described faults and inconveniences are eliminated by the present invention; here one cycle of the welding process comprises the gripping of the material by electrodes, the displacement of the electrodes and the material during the time of which the welding and the setting down of the material takes place, then the opening of the electrodes and the return of the mechanism to the initial position. As a final effect a high strength of the seam and a great efficiency of work are achieved.

According to the invention, when applying small electrodes over small areas the welding can be performed along very sharp curvatures, i.e. along very small arcs, assuring the continuity of welding. When applying longer welding electrodes, a higher efficiency of work can be achieved on straight lines or on smaller curvatures.

The process of welding according to the invention depends on gripping of the material between two oblong electrodes whose movements are symmetrically identic and synchronised. Any movement of one electrode corresponds to the same movement of the other electrode.

According to the invention the apparatus is characterised by the movement of the material during which the process of welding takes place in the first phase, in the second phase the welded material sets under the pressure of electrodes. The welding and the setting take place over a predetermined area, not on a spot. Both processes are performed during the movement of the material, and this is an advantage as concerns the time consumption in comparison with spot and section welding machines.

The opening and returning of the electrodes to the initial position takes place in half the time necessary for the welding and setting of the material.

According to the invention, much time consuming and inconvenient displacement of the welded material is eliminated. Because the consequent actions take place automatically, higher efficiency can be achieved by comparison with section welding machines, taking into account long straight seams or welding along curvatures. The efficiency of welding surpasses the efficiency of work of spot welding machines. The work of the apparatus according to the invention enables the welding of thin and thick foils, textile-reinforced foils, textiles themselves and any combination of textiles and foils. The speed of welding is controlled by means of a pedal starter and can range from zero to a few meters per minute.

Because according to the invention, the process of welding and setting down takes place during the movement of the electrodes, the welded material being in a semiliquid consistency, may be easily damaged. In order to diminish this possibility, any resistance met by the material on the table should be eliminated. For this purpose a system of compressed air is used to provide a cushion for reducing friction and for holding the material during the return of the electrodes, and for cooling of the electrodes.

The material is elevated from the table by a layer of compressed air, being at the same time gently pressed by the palm of the operator of the apparatus. It is very important because the changing of the direction of the welding is made by the operator who can turn the welded material around the axis of the electrodes.

The invention is further described by way of example in the accompanying diagrammatic drawing, in which:

FIGURE 3 is a axonometric projection of the mechanisms of the apparatus;

FIGURE 4 is a flow diagram of the air supply system creating the compressed air layer;

FIGURE 5 is a vertical section of the table according to the invention;

FIGURE 6 is a top view of the above table;

FIGURE 7 is a bottom view of the flow distributing block and the swivel shutter;

FIGURE 8 is an axonometric projection of the flow distributing block;

Figure 1:
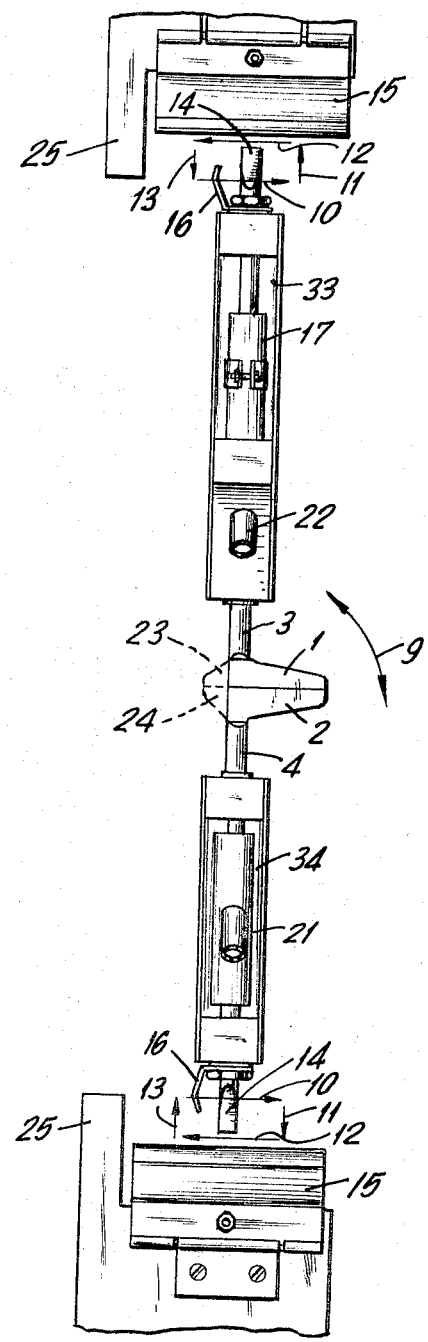
FIGURE 1 is a side view of the system of welding electrodes according to the invention.
Figure 2:
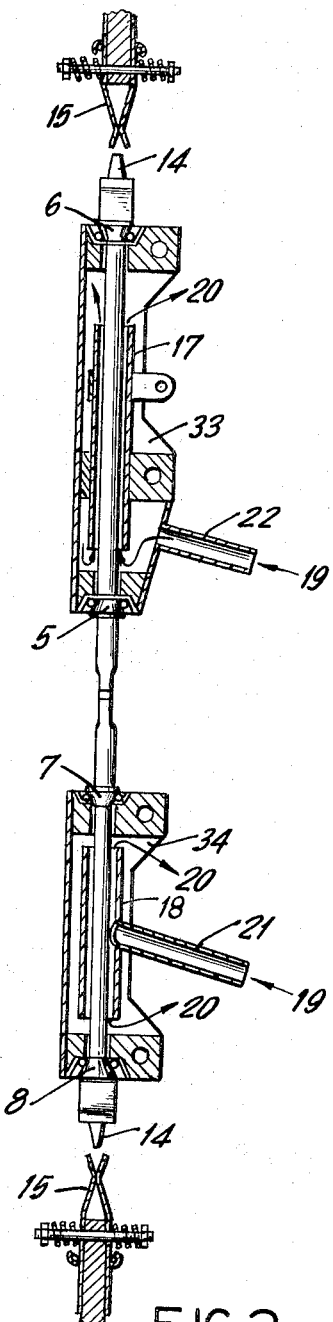
FIGURE 2 is a section through the axis of the welding electrodes by a plane perpendicular to the surface of FIG. 1.

As shown on FIG. 1 the apparatus is equipped with two electrodes 1, 2, fixed to the rods 3, 4 set in mountings 33, 34 by means of ball bearings 5, 6, 7, 8. Pipes 17, 18, fixed around pins 3, 4, form concentric condensers. The remote protruding ends of bolts 3, 4 are provided with flattened tops 14 fitting to the guides 15, and with spring parts 16 sliding along the guide bars 25.

Thus the electrodes 1, 2 may rotate about their axes and trace arcs in a horizontal plane as represented by arrow 9, thereby performing the movements indicated by arrows 10, 11, 12, 13. Electrodes 1, 2, fixed on pins 3, 4, are cooled by a stream of air supplied by way of pipes 21, 22, in the direction shown by arrows 19, 20. If convenient, the electrodes 1, 2, may be provided with extensions 23, 24, shown in FIG. 1 with dotted lines.

The operation of the system is as follows:

Upon clamping the material to be welded, electrodes 1, 2 move together in the direction of arrows 13 and seize the material between them. The electrodes and the clamped sheet are then shifted in the direction 10 and at the same time, between the welded material and the table surface, a layer of compressed air is formed to facilitate transfer of the material in the direction of arrow 10. During this step, electric current is supplied so that the welding of the material and its setting take place. During the movement in directions 11, 12, 13 the compressed air is cut off, and between the foil and the corresponding part of the table, subatmospheric pressure is created, thereby the material is drawn to the table and immobilised. During the initial movement (arrow 10) of the welded material, it is possible to induce the electrodes 1, 2, to rotate about their axis as shown by arrows 9, by deviating the material from the direction of welding, and therefore to carry out welding along curves and other lines. The electrodes return to their initial position during moves 11, 12, 13 and extend in their initial direction of welding because they are each fixed to the bolts 3, 4 at one end only. This way the end of the welded section meets the beginning of the next section to be welded, thereby ensuring the continuity of the seam independently of the angle formed between the two successively welded sections.

In the beginning phase of the move 10, high frequency current runs through electrodes 1, 2, and the welding of the material takes place, the current lasting for about half of the duration of move 10 and being followed by setting of the material. The next move 11 begins and the tops 14 of the rods 3, 4 meet the guides 15 causing return movement of the electrodes and their re-establishment in the initial position. When the tops 14 of the rods 3, 4 leave the guides 15 they are led to the proper position of contact by the spring parts 16 sliding on the guide bars 25.

High-frequency current necessary for the welding of the material is supplied by means of the rods 3, 4 and tubes 17, 18 positioned so as to form concentric condensers serving for the readjustment of the resistance of the welded material to the high frequency generator. The mechanical resistance to the movements of the electrodes 1, 2 is comparatively small, due to the ball bearings 5, 6, 7, 8.

The actuating and control mechanism shown in FIG. 3 ensures the proper functioning of the electrodes as described on FIG. 1. This mechanism is composed of the set of levers 27, 28, 29, 30, a frame 26 pivotally carrying the levers and the control cams 40, 41. Four two-arm levers 27, 28, 29, 30 revolve around parallel horizontal axes within the frame 26. Levers 27, 28 and 29, 30 are connected in pairs by means of links 31, 32 on one end, and by means of heads 33, 34 for the welding electrodes on the other end. The upper and lower lever systems are interconnected by means of two crossed pull rods 35, 36, and are able to perform identical and simultaneous clamping movements in the vertical plane, which correspond to the opening and closing of the electrodes.

The movement of electrodes in the horizontal plane is ensured by the first control means which includes the frame 26 swingable about its vertical axis fixed in the top bearing 37 and bottom bearing 38. The sequence of movements marked with arrows 39 is achieved owing to cams 40, 41 mounted on the same axis; the cam 40 by means of the roll 42 controls the opening and closing of electrodes (second control means), the cam 41 by means of the roll 43 controls the movements of the electrodes in horizontal plane (first control means).

The return of the mechanism to the initial position is achieved by the action of springs 44 and 45. The length of electrodes 1, 2 in horizontal sense depends on the contours of the cam 41.

The air-supply system drawn in FIGS. 4 to 8 closely cooperates with the system of electrodes and the mechanism shown in FIG. 3. The air system facilitates the movement of the material during welding by electrodes 1, 2, and immobilizes the material on the table when the electrodes return to their initial position.

FIG. 4 shows the air circuit when forming the compressed air layer. The hollow table 46 is provided on its top plate, with holes 51 and 47, as well as a throughgoing aperture 59 for electrode 2; holes 51 are drilled skew to the surface, in the direction of the moving material as shown on FIG. 5. The blower 49 is connected with the table by means of an air pipe 50 supplying the air to the chamber and holes 51, and with holes 47 by means of air pipe 48, a flow-distributing block 52 and air pipe 56. The flow distributing block 52, shown in FIGS. 7 and 8 is supplied with swivel shutter 57, rotating around the axis 58, and its function is to close the opening 54 by which the air enters. The opening 55 is connected with the table and the opening 53 communicates with the inlet pipe of the blower 49.

The opening 54 of the flow-distributing block 52 is unblocked when the electrodes grip the material. The air flows through 54 and 53 to the air pipe 56 and the blower 49, thence through air pipe 50, the chamber of the table 46 and through holes 51 between the table and the material.

The layer of air moves with the material in the direction of welding, during the initial step (arrows 10). During the move 11 the swivel shutter closes the opening 54 and air is drawn through holes 47 and flows through the air pipe 48, block 52, air pipe 56 and the blower 49, in which the subatmospheric pressure is formed. The material is then held against the table.

During the welding of large pieces, such as tents, car covers etc., some additional tables may be provided forming extensions to the table 46, in dependence upon the size of the materials to be welded.

Figure 9:
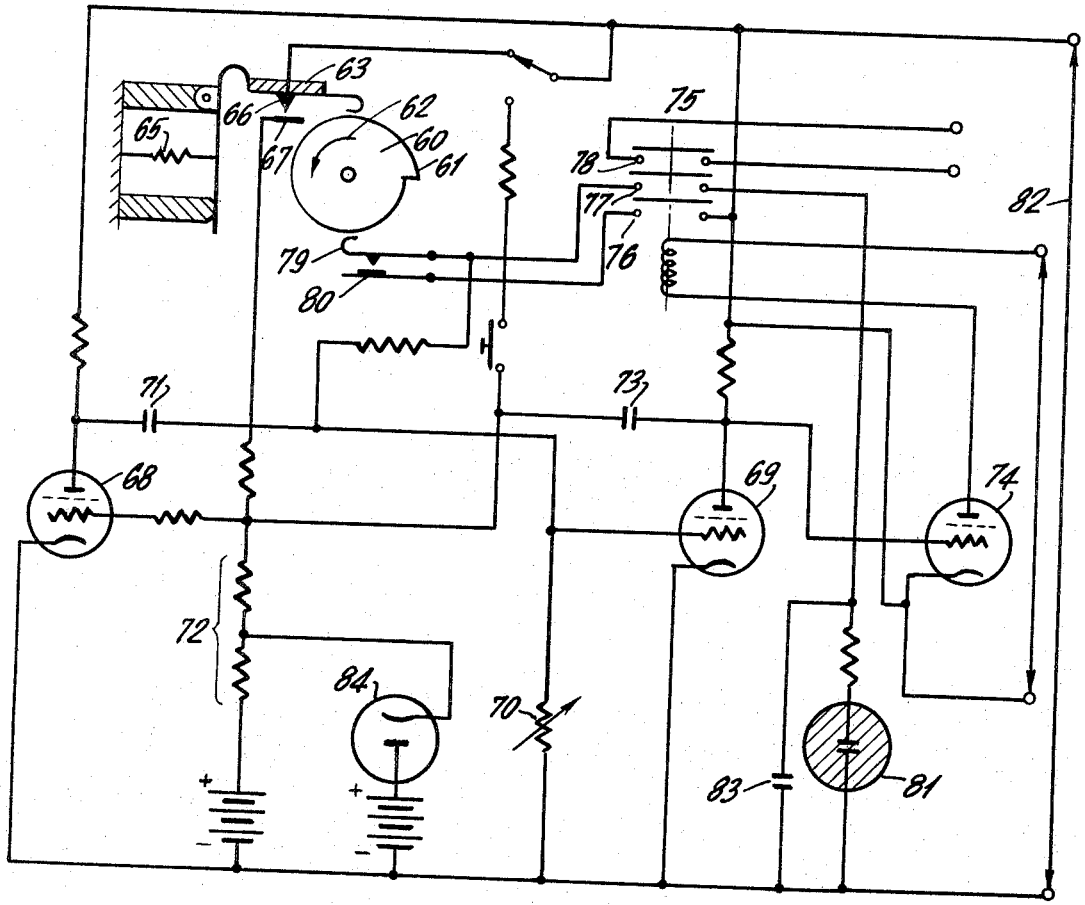
FIGURE 9 is a circuit diagram of the electronic steering system.

The electronic control circuit shown on FIG. 9, enables the cyclic switching on of high-frequency voltage to feed the electrodes of the apparatus. The role of this circuit is to switch on and off the anode voltage of the generator. The anode voltage can be turned on permanently; it is then necessary to supply a correspondingly large negative potential to the grid of the generator electron tube, as is necessary for terminating oscillation.

The drum switch 60, synchronized with the actuating mechanism, revolves in the direction of the arrow 62 and with its nose 61 lifts the armature 63 fixed resiliently on the bracket 64 and biased by the spring 65. When the armature 63 drops down from the nose 61 it connects contacts 66 and 67, and therefore supplies positive polarity to the grid of the choked triode 68. Triode 68 begins to conduct, whereas triode 69 is choked for a period determined by the time constant of the resistance 70 and the condenser 71, because the time constant of network 72 and 73 is much higher than the time constant of network 70 and 71. When conduction of tube 69 is cut off, triode 74 becomes conductive inducing the energization of relay 75 and the connection of its contacts 76, 77, 78.

The working phase of the control circuit cannot last longer than half the revolution of the drum switch 60 owing to the specific construction of the mechanism. The above requirement is fulfilled by the contacts 79, 80 of the drum switchover and the contacts 76 of the relay 75, cancelling the multivibrator impulse by supplying a positive signal to the grid of tube 69.

In order to avoid shortening of the control impulse a light signal is produced; when the impulse shortening takes place, the lamp 81 is illuminated. The shortening of the "work" signal occurs as follows: voltage 82 is applied by the pair of contacts 76 to the contact 80; when the signal fades before the nose 61 engages the contact 79 no change will occur in the circuit; in case the signal lasts longer than half of the revolution of the drum switch 60, the voltage 82 is applied through contacts 79, 80 and through the corresponding resistance to the grid of tube 69 causing a breakdown conduction and shortening of the work impulse.

At the same time, via contacts 77, the voltage 82 appears on the condenser 83 whose discharge causes a lamp 81 to flash which is a signal that the work impulse should be shortened either by raising the power of the circuit or by diminishing the speed of drum switch 60 thereby, resulting in the slowing down of the speed of welding.

In order to shorten the time of restabilizing the multivibrator circuit, the lamp 84 was applied in the system, and it effects shortening of this period very effectively. The function of tube 84 is to discharge condenser 73 which was fully charged during the conduction phase of tube 68. If condenser 73 is not discharged to a certain minimum level, the system will not be able to start its work operation. The loading current of the condenser 73 must be sufficient to cause a drop of voltage large enough to enable the conduction of tube 68. Owing to tube 84, the condenser 73 is quickly discharged, enabling the immediate start of work of the system. The start of work of the system at every cycle of the drum switch is essential in order to avoid any stoppages of welding.

Figure 10:
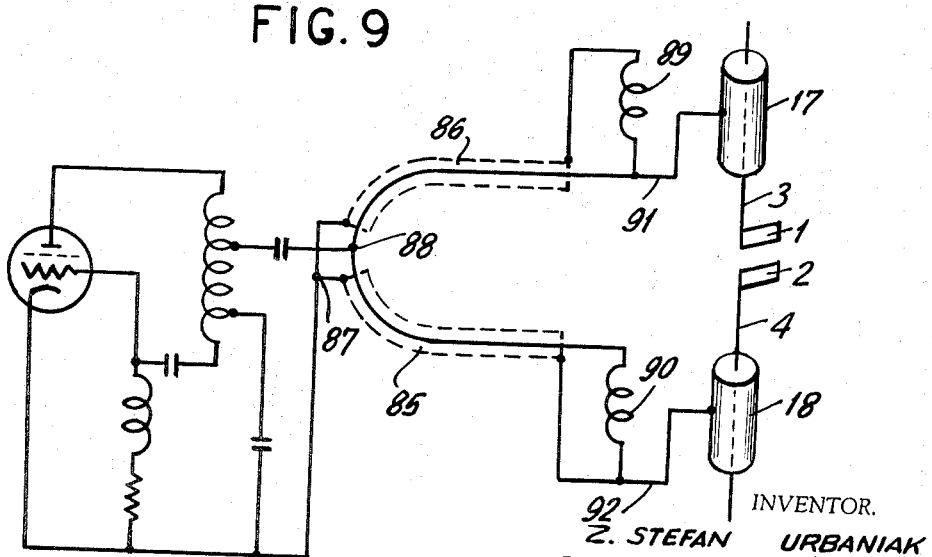
FIGURE 10 is a circuit diagram of the feeding scheme of the electrodes.

In order to supply the energy necessary for welding of the given material, a special system shown in FIG. 10, for adaptation of the resistance of the material to the resistance of the high-frequency generator is employed. This system comprises two concentric cables 85, 86, having a common beginning in 87, 88, and connected to the resonance circuit; these cables have at their ends the induction coils 89 and 90. Electrodes 1, 2, are fed from both cables such that the coil 89 is connected with the tube 17 of the concentric condenser by means of wire 91, and the coil 90 with the tube 18 of the other concentric condenser by means of wire 92. The wire 91 is connected to the beginning of coil 89, and the wire 92 is connected to the end of coil 90. The tube 17 and the bolts 3 as well as the tube 18 and the bolts 4 form two concentric condensers, and the value of their capacity is constant.

The construction of the latter described mechanism is shown partly in FIG. 1. The adaptation of the system may be achieved by the regulation of the connection points 91, 92 on coils 89, 90. It is possible as well to switch a regulation condenser into one of the wires 91 or 92.

What I claim is:

1. An apparatus for the continuous high-frequency welding of plastic foils, comprising:
    (a) a generally horizontal table for supporting at least a pair of superimposed plastic foils to be welded together;
    (b) a pair of electrodes extending transversely to said table and engageable with foils thereon for applying said high-frequency current thereto;
    (c) actuating means coupled with said electrodes for shifting same toward and away from one another for the selective clamping of said foils therebetween, said electrodes being journaled in said actuating means for substantially freely joined angular movement about a common axis perpendicular to said table upon movement of the foils clamped thereby by an operator;
    (d) first control means operatively connected with said actuating means for jointly shifting said electrodes in a direction parallel to said table from an initial position to a final position and thereafter returning said electrodes to said initial position with respect to said table;
    (e) second control means operatively connected with said actuating means for clamping said foils between said electrodes at said initial position, maintaining said foils clamped between said electrodes during movement of said electrodes from said initial position to said final position, and thereafter releasing said foils from said electrodes prior to the return thereof to said initial position;
    (f) guide means co-operating with said electrodes upon the release of the foils thereby and upon return of said electrodes to said initial position for angularly repositioning said electrodes about their common axis; and
    (g) a high-frequency electric generator operatively coupled with said electrodes for delivering a welding current thereto.

2. An apparatus as defined in claim 1 wherein said table is hollow and is formed with a multiplicity of perforation along its upper surface, said apparatus further comprising:
    (h) means for selectively delivering a stream of air to at least some of said perforations during the movement of said electrodes with said foils clamped therebetween for supporting said foils on said table with little frictional engagement thereof; and
    (i) means for selectively applying suction to at least certain of said perforations prior to the engagement of said electrodes with said foils for retaining said foils against said table.

3. An apparatus as defined in claim 1 wherein said actuating means includes a pair of tubes on opposite sides of said table coaxially surrounding said electrodes and forming clearances therewith, said apparatus further comprising:
    (h) a source of cooling fluid communicating with said clearances for dissipating heat from said electrodes.

4. An apparatus as defined in claim 1 wherein said generator includes an electronic control circuit provided with an electronic switch synchronized with said first and said second control means for establishing the duration of energization of said electrodes.

5. An apparatus as defined in claim 1, further comprising
    (h) means responsive to the resistance of said foils for controlling the operation of said generator.

6. An apparatus as defined in claim 2 wherein said actuating means includes a pair of supports respectively receiving said electrodes with freedom of rotation about said common axis, a pair of parallelogrammatic linkages respectively hinged to said supports and swingable for parallel movement of said supports and the respective electrodes, and a frame carrying said parallelogrammatic linkages for swinging movement thereof about an axis perpendicular to said table; said first control means including a cam connected with at least one of said parallelogrammatic linkages for swinging same about an axis parallel to said table, said second control means including a further cam acting upon said frame for swinging same about its axis perpendicular to said table, said apparatus further comprising common drive means for said cams; said electrodes having remote extremities projecting from the respective supports, said guide means including a pair of guide channels respectively receiving said extremities for reorienting said electrodes; and said table is hollow and formed with a multiplicity of perforations opening in the direction of said foil; said apparatus further comprising means for delivering compressed air to certain of said perforations during the clamping of said foils between said electrodes and the movement of the latter from said initial position toward said final position, means for applying suction to others of said perforations for drawing said foils against said table prior to engagement of said foils by said electrodes, and valve means driven synchronously with said cams for controlling said compressed air and said suction.

References Cited

UNITED STATES PATENTS

| | | | |
|---|---|---|---|
| 2,476,283 | 7/1949 | Castellan | 219—10.53 X |
| 2,525,355 | 10/1950 | Hoyler | 219—10.53 X |
| 2,539,646 | 1/1951 | Welch | 219—10.53 |
| 2,609,481 | 9/1952 | Hacklander | 219—10.53 |
| 2,728,839 | 12/1955 | Hart | 219—10.53 |

RICHARD M. WOOD, *Primary Examiner.*

L. H. BENDER, *Assistant Examiner.*